United States Patent [19]

Meier

[11] 3,926,270

[45] Dec. 16, 1975

[54] FORCE MEASURING DEVICE

[75] Inventor: Johann Meier, Brione sopra Minusio, Switzerland

[73] Assignee: Precisa AG Rechenmaschinenfabrik, Zurich, Switzerland

[22] Filed: Aug. 12, 1974

[21] Appl. No.: 496,846

[30] Foreign Application Priority Data

Aug. 14, 1973  Switzerland...................... 11665/73

[52] U.S. Cl. ................ 177/251; 177/230; 177/172; 177/DIG. 9
[51] Int. Cl.² ........................................... G01G 1/18
[58] Field of Search ........................... 177/171–172, 177/230, 246, 251, 256–261; 74/510; 308/2 R, DIG. 2

[56] References Cited
UNITED STATES PATENTS

| | | | |
|---|---|---|---|
| 1,596,547 | 8/1936 | Osgood............................... | 177/260 |
| 1,670,597 | 5/1938 | Stubbs................................ | 177/259 |
| 2,000,168 | 5/1935 | Gilbert................................ | 177/260 |
| 2,634,966 | 4/1953 | Williams............................. | 308/2 R |
| 2,646,271 | 7/1953 | Williams............................. | 177/261 |
| 2,936,994 | 5/1960 | Lau.................................... | 177/DIG. 9 |
| 3,097,715 | 7/1963 | Litchard............................. | 308/2 R |
| 3,658,144 | 4/1972 | Corbitt............................... | 177/DIG. 9 |

*Primary Examiner*—L. T. Hix
*Assistant Examiner*—Vit W. Miska
*Attorney, Agent, or Firm*—Eric P. Schellin

[57] ABSTRACT

A force measuring device having a leverage system the levers of which are coupled together utilizing a special connecting element. The connecting element provides for flexible movement between the levers and also for longitudinal adjustment therebetween.

6 Claims, 6 Drawing Figures

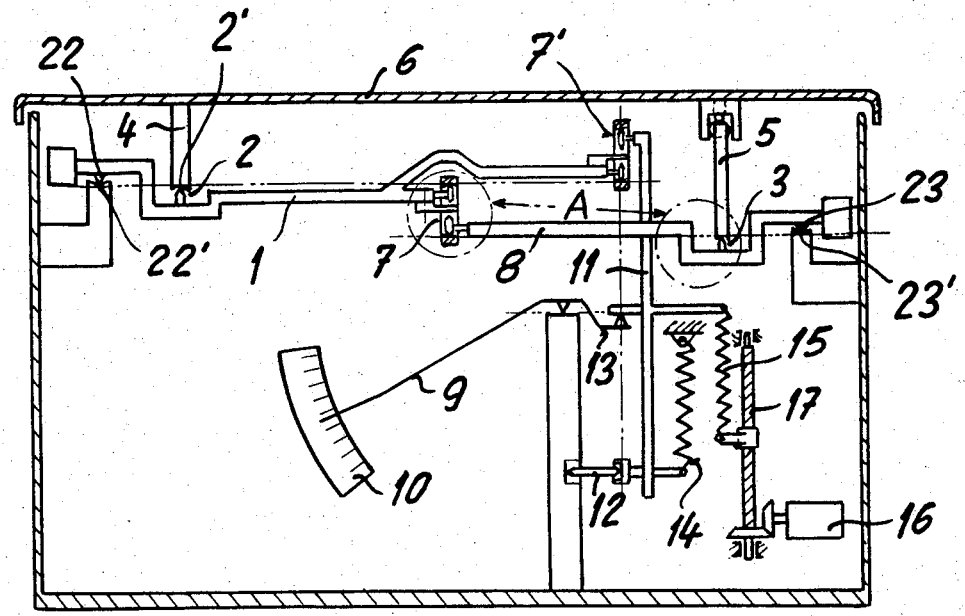
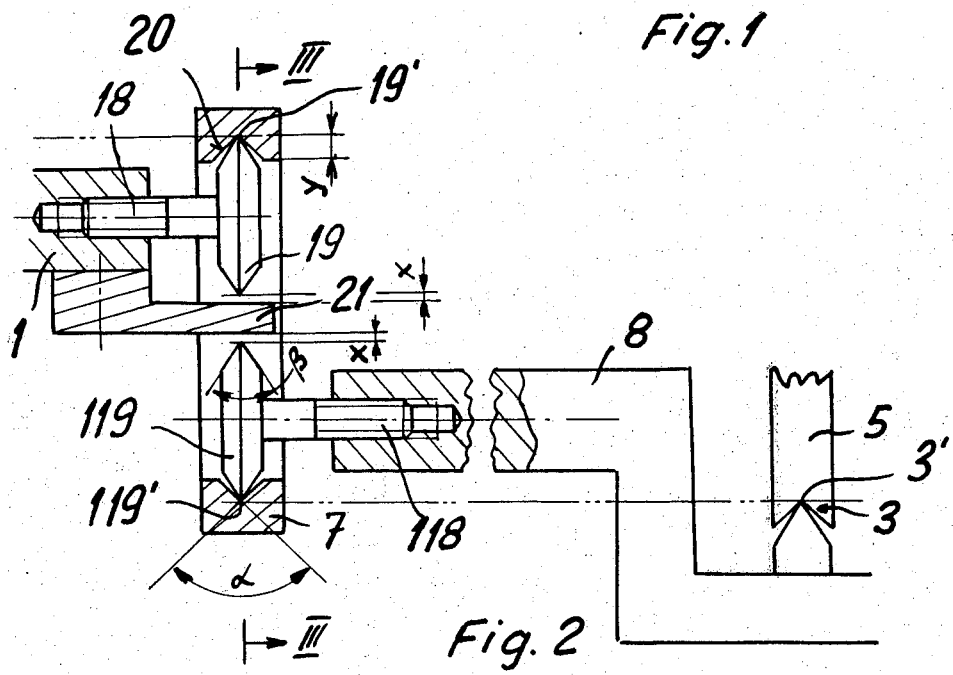

FORCE MEASURING DEVICE

BACKGROUND OF THE INVENTION

This invention relates to a force measuring device, particularly a weighing machine, in which the force to be measured is transmitted to an indicating device through a leverage system.

With a spring balance lever system a problem arises in that in order to eliminate measuring errors, the transfer ratio of the measured force transmitting lever system has to be adjusted individually with each unit, to comply with the force characteristic of the spring or springs deployed, and at the same time the friction losses occurring in the measured force transmitting components have to be kept to a minimum.

A weighing machine in which the distance of the two pivots supporting a lever can be altered by changing the washers is already known. This is, however tedious and does not provide the means for adjusting loosely connected edges which are fitted on two different parts.

SUMMARY OF THE INVENTION

The object of the present invention is to provide a force measuring device in which the transfer-ratio of two flexibly linked elements transmitting the force to be measured can be set accurately to the desired value within certain limits, and in which friction losses caused by the transmission of the force to be measured from the lever to the further transfer part do not effect the indications.

According to the present invention there is provided a force measuring device of the type described wherein a lever and a flexibly linked transmission member are both fitted with a disc shaped edge at the point of linkage which can be adjusted along the direction of the longitudinal axis of the levers, the disc shaped edges being flexibly connected to a circular connecting element comprising a pair of oppositely arranged and inwardly directed edge counterbearings.

It is advantageous when the edges and the edge counterbearing have a circular shape that the outer radius of the disc shaped edges is smaller than the radius of the curvature of the edge counterbearing at the point of contact of the disc edge.

In order to avoid disengagement of the disc edges and the edge counterbearing, which may be caused for instance by a violent shock, it is advantageous that a bar-shaped securing part extends between the two edges, its distance from the edges being smaller than the depth of the receiving groove of the edge counterbearing.

For the purpose of achieving a simple but sufficiently accurate adjusting facility of the edges, it is advisable that each disc edge should be connected to the lever and to the transmission part by a screw extending parallel to the longitudinal axis of the lever.

To avoid errors in measurement, it is advantageous in weighing machines using two levers that the first lever is flexibly connected to the second lever by means of a first connecting element and cooperating edges in order to form two supporting points consisting of edges, and also the necessary supports for the platform of a scale. Furthermore it should be connected flexibly to the indicating system by means of a second connecting element and co-ordinated edges and so that all the edge contacting points arranged on the levers be in the corresponding planes.

BRIEF DESCRIPTION OF THE DRAWINGS

The invention will now be described in detail by way of example only with reference to the accompanying drawings, wherein:

FIG. 1 shows a longitudinal section of a force measuring device in the form of a spring balance, FIG. 2 shows cut-off portion A of FIG. 1 in an enlarged scale.

DETAILED DESCRIPTION OF PREFERRED EMBODIMENTS

Figure 3:
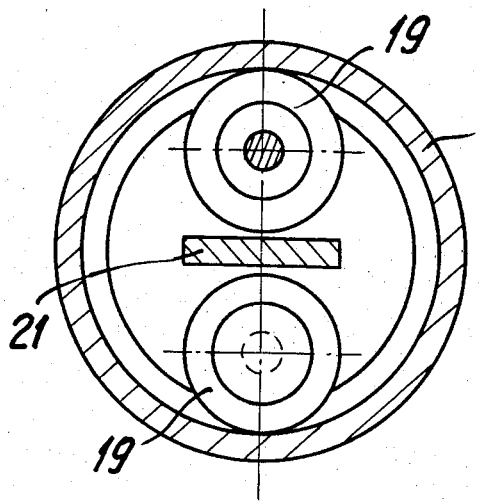
FIG. 3 shows a sectional view along lines III—III of FIG. 2.

FIG. 1 shows a force measuring device having a measuring platform 6 which rests on two supports 4 and 5. The supports are seated on two respective knife edges 2 and 3 on levers 1 and 8. Levers 1 and 8 are linked flexibly by connecting element 7 and lever 1 is similarly linked with lever 11 by connecting element 7'. Lever 11 acts on an indicating system 9, 10, and its parallel guide is secured by pedestal supports 12 and 13 and it is connected by a measuring spring 14 acting against the force to be measured.

Furthermore, lever 11 is connected to tare spring 15, allowing tare balancing. Tare spring 15 acts against measuring spring 14 and its tensioning may be adjusted to the tare which is balanced by adjusting motor 16 and rotary spindle 17. Maximum tensioning of tare spring 15 corresponds to the maximum allowable tare.

As the force characteristic of springs 14 and 15 may somewhat vary with individual spring sets it is necessary to accurately adjust the transfer ratio of levers 1 and 8 taking into account spring characteristics in order to achieve accurate measurement indication on scale 10.

For this purpose flexibly linked levers 1 and 8 are fitted with circular or disc-shaped edges 19 and 119 as shown in FIGS. 2 and 3 and these are adjustable by the screws 18 and 118 longitudinally in the direction of the leverage.

Circular edges 19 and 119 are flexibly connected by a circular connecting element 7, which constitutes a pair of oppositely arranged inwardly movable directed edge-bearings. Thus edges 19 and 119 engage the cross-sectionally V-shaped circular recessed groove 20 the plane of which is orthogonal to levers 1 and 8 and which forms the above-mentioned inwardly directed edge counterbearings.

After fitting edges 19' and 119' into connecting element 7 a securing bar 21 is located between the disc-shaped edges 19 and 119 setting the distance between the bar and the edges smaller than the depth of the receiving groove 20, thus edges 19 and 119 cannot fall out from groove 20 in case of violent shock affecting the scales.

The transfer ratios of main levers 1 and 8 may be independently and accurately adjusted by the method described. Connecting element 7 links levers 1 and 8 flexibly and edges 19 and 119 so that the occurring friction losses are practically zero and do not affect the indicated measurement value at all.

The flexible and adjustable connection between lever 1 and lever 11 is identical with the previously described connecting element between levers 1 and 8 employing edges 19 and 119.

The edge contact points 22', 2' and 19' co-ordinated to lever 1 and edge contact spots 119', 3' and 23' are in the same appropriate plane in order to achieve highest possible accuracy.

In order to avoid a shift in the center of gravity affecting the measurement, it is advisable to arrange levers 1 and 8 in such a manner that their center of gravity is in swing axes 22' and 23' of the main levers 1 and 8.

Figure 4:
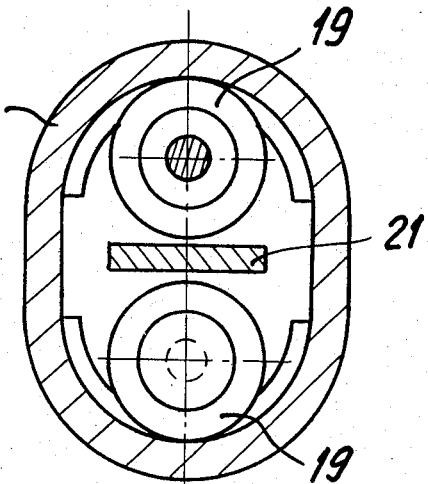
FIG. 4 shows a sectional view similar to FIG. 3 as a second embodiment of the connecting member.

A second embodiment of a connecting element 7 of an adjustable edge connection is shown in FIG. 4 which is a sectional view similar to FIG. 3 and in which the edge counterbearings take the form of a parabolic or of an elliptical camber.

Figure 5:
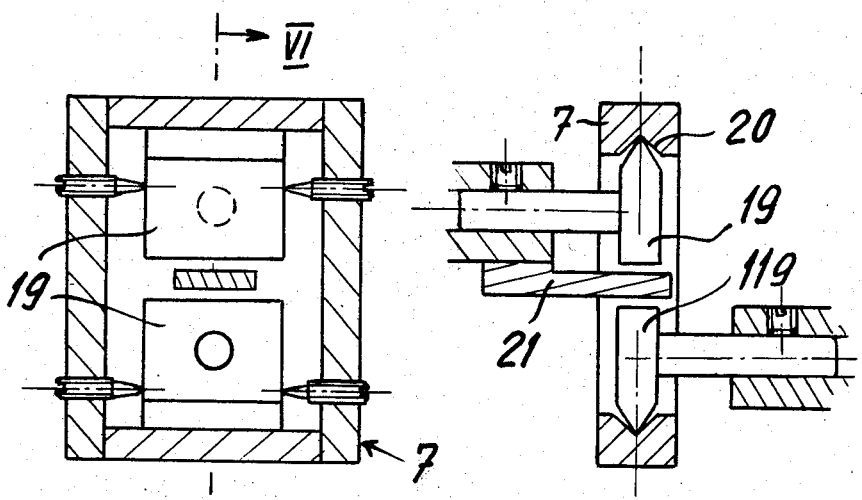
FIG. 5 shows a sectional view similar to FIG. 3 as an embodiment of the connecting link member.
Figure 6:
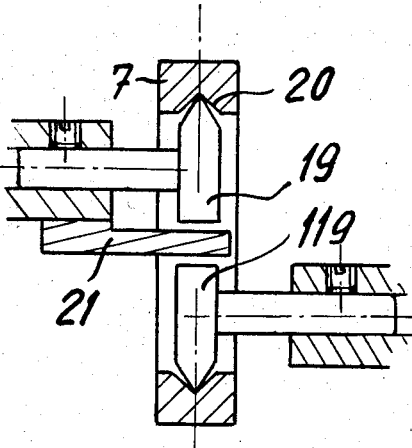
FIG. 6 shows a sectional view along lines VI—VI of FIG. 5.

A further embodiment of an adjustable edge connection is shown in FIGS. 5 and 6 with which edges 19 and 119 are linear and the connection element consists of a rectangular frame 7.

I claim;

1. A force measuring device in which a force to be measured is transmitted from a measuring position to an indicating device to be displayed thereon, said measuring device comprising: leverage means operably responsive to the force to be measured applied thereto at said measuring position, said leverage means including at least two levers coupled to said indicating device; coupling means for interconnecting said levers, said coupling means having two adjacently disposed end members which are respectively adjustably mounted on said levers at the point of interconnection therebetween for longitudinal movement relative thereto, and housing means provided with a grooved recess for flexibly and securely accomodating said adjustable end members therein, said two levers being orthogonal to the plane of said grooved recess, and said end members being located in said plane.

2. A force measuring device as claimed in claim 1 wherein said end members are circularly shaped and said grooved recess is provided with a parabolic or elliptical camber.

3. A force measuring device in which a force to be measured is transmitted from a measuring position to an indicating device to be displayed thereon, said measuring device comprising: leverage means operably responsive to the force to be measured applied thereto at said measuring position, said leverage means including at least two levers coupled to said indicating device; coupling means for interconnecting said levers, said coupling means having two adjacently disposed disc-shaped end members, said end members being respectively adjustably mounted on said levers at the point of interconnection therebetween for longitudinal movement relative thereto; and housing means provided with a circular grooved recess for flexibly and securely accomodating at least one of the peripheral edges of said disc-shaped adjustable end members therein, the outer radius of each of the disc-shaped members being smaller than the radius of curvature of the grooved recess at the point of contact thereof.

4. A measuring device as claimed in claim 3, wherein a bar shaped securing member is mounted on one of said levers vicinal to the point of interconnection therebetween and extends between the adjacently disposed end member at a distance therefrom which is less than the depth of the recessed grooves in said housing means.

5. A measuring device as claimed in claim 4, wherein said recessed grooves have an opening angle of at least 90° and said end members a smaller edge angle within the rnage 60° to 80°.

6. A force measuring device as claimed in claim 5, wherein said end members are connected to respective ones of said levers by screw means which extend parallel to the longitudinal axis of the levers.

* * * * *